US012647819B2

(12) United States Patent
 Sridhar et al.

(10) Patent No.: US 12,647,819 B2
(45) Date of Patent: Jun. 2, 2026

(54) HYPERFINE NETWORK SLICING

(71) Applicant: Zscaler, Inc., San Jose, CA (US)

(72) Inventors: Kartik Kumar Chatnalli Deshpande Sridhar, Kirkland, WA (US); Arvind Nadendla, San Jose, CA (US); Kenneth B. Urquhart, Rancho Mirage, CA (US); Subramanian Srinivasan, Milpitas, CA (US)

(73) Assignee: Zscaler, Inc., San Jose, CA (US)

( * ) Notice: Subject to any disclaimer, the term of this patent is extended or adjusted under 35 U.S.C. 154(b) by 412 days.

(21) Appl. No.: 18/339,752

(22) Filed: Jun. 22, 2023

(65) Prior Publication Data

US 2023/0422086 A1    Dec. 28, 2023

Related U.S. Application Data

(60) Provisional application No. 63/354,485, filed on Jun. 22, 2022.

(51) Int. Cl.
 *H04W 28/02* (2009.01)
 *H04W 28/20* (2009.01)
(52) U.S. Cl.
 CPC ....... *H04W 28/0268* (2013.01); *H04W 28/20* (2013.01)
(58) Field of Classification Search
 None
 See application file for complete search history.

(56) References Cited

U.S. PATENT DOCUMENTS

| | | | |
|---|---|---|---|
| 7,496,750 B2 | 2/2009 | Kumar et al. | |
| 7,551,567 B2 | 6/2009 | Anthias et al. | |
| 8,005,000 B1 | 8/2011 | Srinivasan | |
| 8,612,295 B2 | 12/2013 | Gidwani et al. | |
| 10,848,395 B2 | 11/2020 | Srinivasan | |
| 11,075,923 B1 | 7/2021 | Srinivasan et al. | |
| 11,537,456 B2 | 12/2022 | Nadendla et al. | |
| 2007/0124585 A1* | 5/2007 | Feather ................. | H04L 63/104 713/168 |
| 2018/0123878 A1* | 5/2018 | Li ........................... | H04L 47/70 |
| 2020/0059856 A1* | 2/2020 | Cui ........................ | H04L 41/40 |
| 2020/0195614 A1 | 6/2020 | Chanak et al. | |
| 2020/0259792 A1* | 8/2020 | Devarajan ........... | H04L 63/1416 |
| 2020/0320192 A1* | 10/2020 | Ma .......................... | G06N 20/20 |

(Continued)

FOREIGN PATENT DOCUMENTS

| | | |
|---|---|---|
| EP | 1839176 B1 | 6/2018 |
| EP | 4167116 A1 | 4/2023 |

*Primary Examiner* — Andre Tacdiran
(74) *Attorney, Agent, or Firm* — Baratta Law PLLC; Lawrence A. Baratta, Jr.

(57) ABSTRACT

A method implemented via a cloud-based system for network slicing in a 5G network includes connecting with a device that connects to the 5G network, wherein the cloud-based system includes a plurality of nodes interconnected to one another and including one or more nodes integrated in a user plane of the 5G network; inline monitoring traffic between the device and destinations including any of the Internet, cloud services, private applications, edge compute, Multiaccess Edge Compute (MEC), public/private data centers, and public/private clouds; and enforcing bandwidth control, in the 5G network, to a defined Quality of Service for a slice associated with the device.

14 Claims, 12 Drawing Sheets

(56)  References Cited

U.S. PATENT DOCUMENTS

| | | | |
|---|---|---|---|
| 2021/0084523 A1* | 3/2021 | Kucera | H04W 28/0268 |
| 2021/0282230 A1* | 9/2021 | Nelson | H04W 76/12 |
| 2022/0060948 A1* | 2/2022 | Harsha | H04W 28/0268 |
| 2022/0255865 A1* | 8/2022 | Narula | H04L 47/24 |
| 2022/0286428 A1 | 9/2022 | Howe et al. | |
| 2022/0286429 A1 | 9/2022 | Howe et al. | |
| 2022/0286854 A1 | 9/2022 | Howe et al. | |
| 2022/0286860 A1 | 9/2022 | Howe et al. | |
| 2022/0286911 A1 | 9/2022 | Howe et al. | |
| 2022/0286912 A1 | 9/2022 | Howe et al. | |
| 2022/0377131 A1* | 11/2022 | Szilagyi | H04L 41/0894 |
| 2022/0417121 A1* | 12/2022 | Muñoz De La Torre Alonso | H04L 41/142 |
| 2023/0039817 A1* | 2/2023 | Liu | H04W 24/02 |
| 2023/0123162 A1* | 4/2023 | Yadhav | G06F 9/4856 370/331 |
| 2024/0333726 A1* | 10/2024 | Kim | H04W 28/0273 |

* cited by examiner

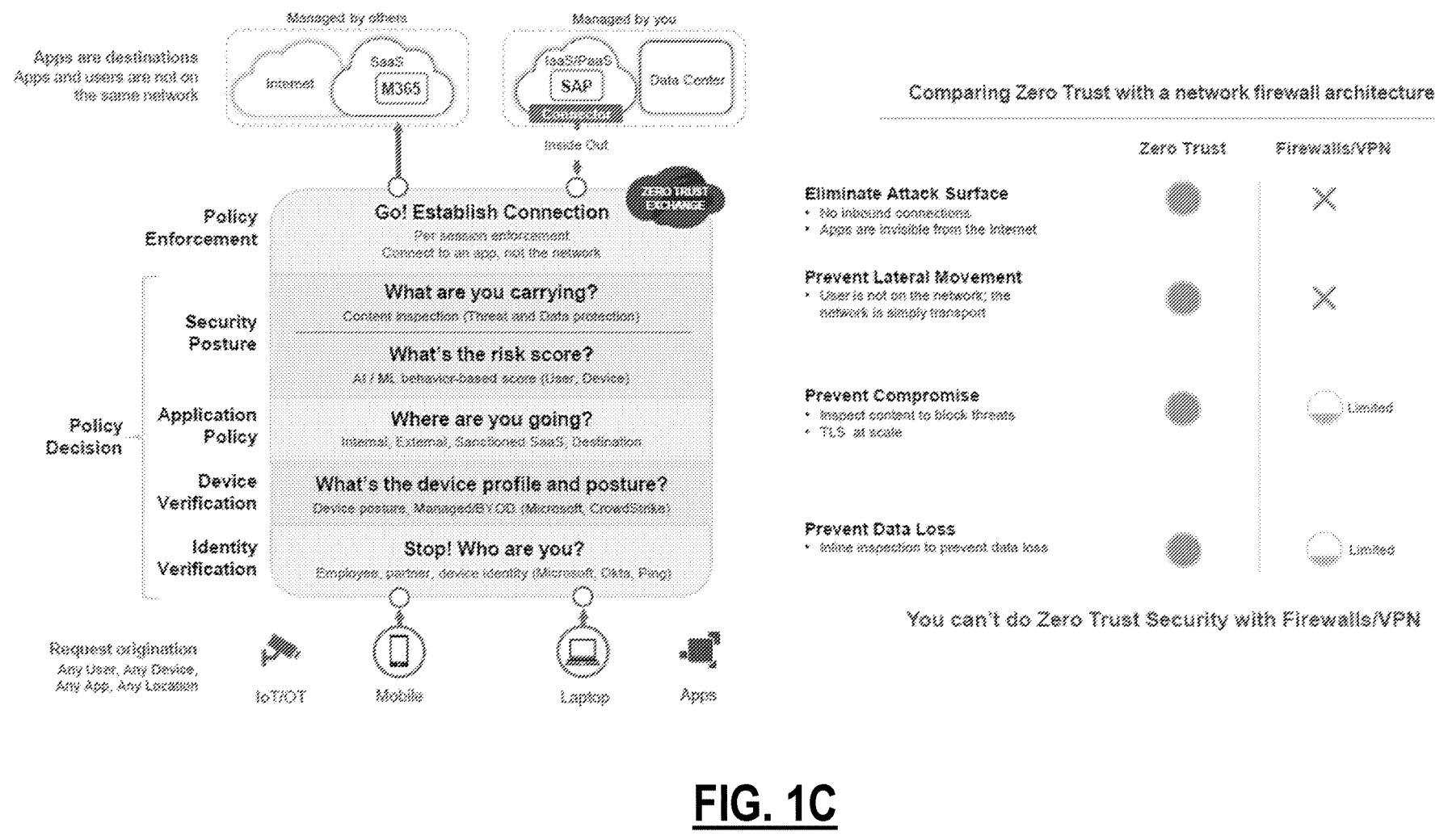

Comparing Zero Trust with a network firewall architecture

| | Zero Trust | Firewalls/VPN |
|---|---|---|
| Eliminate Attack Surface<br>· No inbound connections<br>· Apps are invisible from the Internet | ● | ✕ |
| Prevent Lateral Movement<br>· User is not on the network, the network is simply transport | ● | ✕ |
| Prevent Compromise<br>· Inspect content to block threats<br>· TLS at scale | ● | ◐ Limited |
| Prevent Data Loss<br>· Inline inspection to prevent data loss | ● | ◐ Limited |

You can't do Zero Trust Security with Firewalls/VPN

Go! Establish Connection
*Per session enforcement*
*Connect to an app, not the network*

What are you carrying?
*Content inspection (Threat and Data protection)*

What's the risk score?
*AI / ML network-based score (User / Device)*

Where are you going?
*Internal, External, Sanctioned SaaS, Destination*

What's the device profile and posture?
*Device posture, managed by (e) Microsoft, Crowdstrike*

Stop! Who are you?
*Employee, partner, device identity (Microsoft, Okta, Ping)*

Policy Enforcement

Security Posture

Application Policy

Device Verification

Identity Verification

Policy Decision

Managed by you
SaaS/PaaS
SAP
Data Center
Inside Out

Managed by others
SaaS
M365
Internet

*Request origination*
*Any User, Any Device,*
*Any App, Any Location*

IoT/OT     Mobile     Laptop     Apps

*Apps are destinations*
*Apps and users are not on the same network*

FIG. 1C

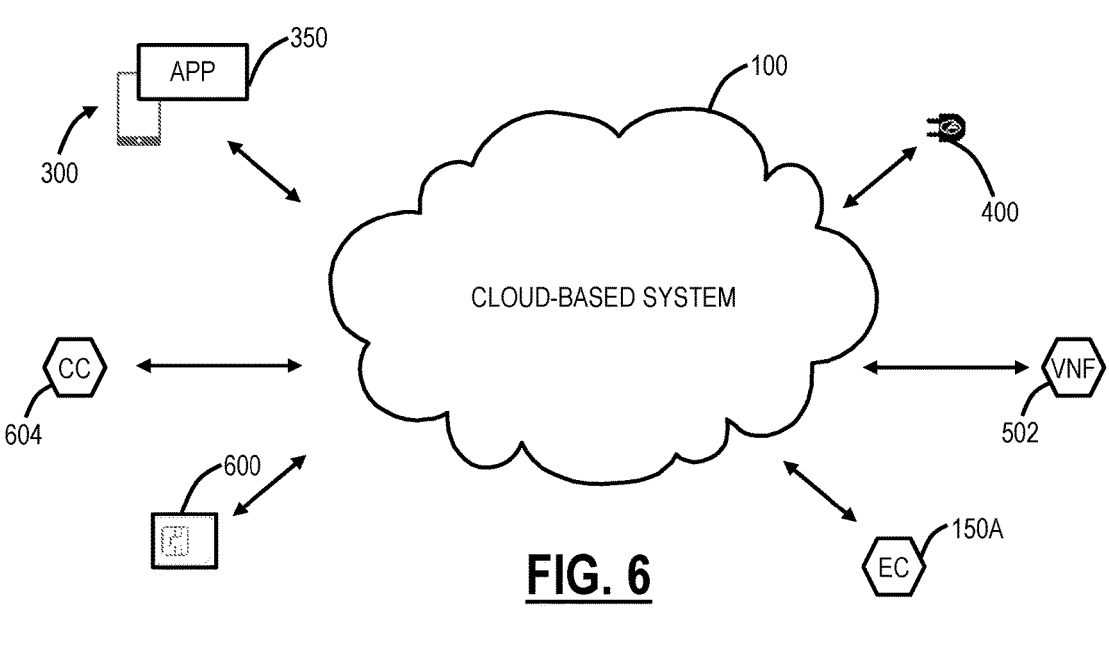
FIG. 6
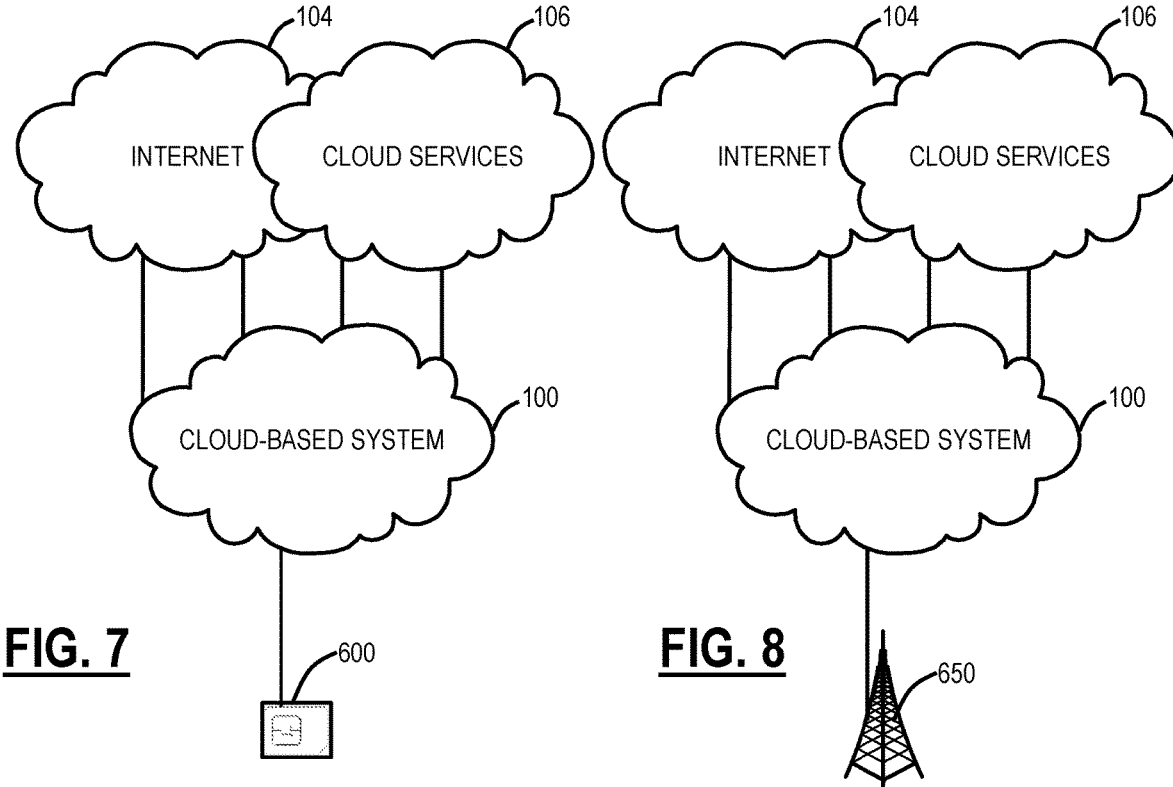
FIG. 7    FIG. 8

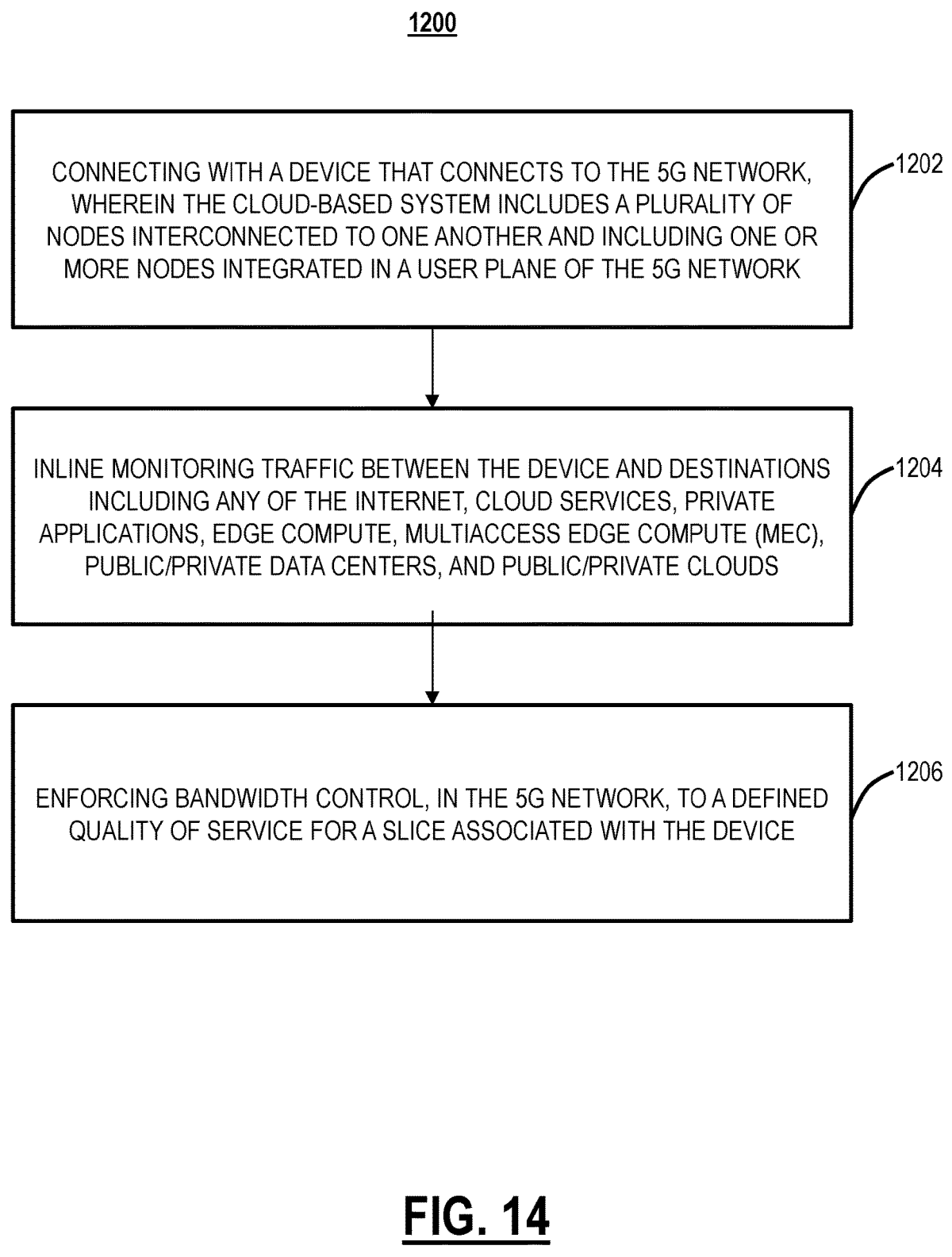

1200

CONNECTING WITH A DEVICE THAT CONNECTS TO THE 5G NETWORK, WHEREIN THE CLOUD-BASED SYSTEM INCLUDES A PLURALITY OF NODES INTERCONNECTED TO ONE ANOTHER AND INCLUDING ONE OR MORE NODES INTEGRATED IN A USER PLANE OF THE 5G NETWORK ⟋1202

INLINE MONITORING TRAFFIC BETWEEN THE DEVICE AND DESTINATIONS INCLUDING ANY OF THE INTERNET, CLOUD SERVICES, PRIVATE APPLICATIONS, EDGE COMPUTE, MULTIACCESS EDGE COMPUTE (MEC), PUBLIC/PRIVATE DATA CENTERS, AND PUBLIC/PRIVATE CLOUDS ⟋1204

ENFORCING BANDWIDTH CONTROL, IN THE 5G NETWORK, TO A DEFINED QUALITY OF SERVICE FOR A SLICE ASSOCIATED WITH THE DEVICE ⟋1206

FIG. 14

HYPERFINE NETWORK SLICING

CROSS-REFERENCE TO RELATED APPLICATION(S)

The present disclosure claims priority to U.S. Provisional Patent Application No. 63/354,485, filed Jun. 22, 20222, the contents of which are incorporated by reference in their entirety.

FIELD OF THE DISCLOSURE

The present disclosure generally relates to computer networking systems and methods. More particularly, the present disclosure relates to systems and methods for hyperfine network slicing via a cloud-based system incorporated in a 5G network.

BACKGROUND OF THE DISCLOSURE

Fifth generation (5G) wireless deployments are ongoing. 5G means more data, more services, and more devices. 5G is more than a set of standards for next-generation wireless networking. Rather, 5G includes aspects of wireless and wireline network integration. One key aspect of 5G is network slicing which allows operators to split a single physical network into multiple virtual networks. Thus, operators deploy one single physical infrastructure and partition networks virtually using network slicing. Network slicing technology enables operators to provide networks on an as-a-service basis, which enhances operational efficiency while reducing time-to-market for new services. A network slice could span across multiple parts of the network (e.g., terminal, access network, core network, and transport network) and could also be deployed across multiple operators. A network slice includes dedicated and/or shared resources, e.g., in terms of processing power, storage, and bandwidth and has isolation from the other network slices. Slice types could be defined from a functional, operational, or behavioral perspective.

Also, cloud-based security solutions have emerged, such as Zscaler Internet Access (ZIA) and Zscaler Private Access (ZPA), available from Zscaler, Inc., the applicant and assignee of the present application. These cloud-based services operate inline between User Equipment (UE) and the Internet. However, many 5G use cases do not require moving data between the UE and the cloud, but rather data between the UE and Multiaccess Edge Compute (MECs) devices available physically close to the UE to reduce network latency. When the MEC is owned by the customer, or leased/subscribed by the customer from the 5G network service provider, this arrangement can be used to limit the amount of UE data traffic traversing farther into the 5G network for reasons of privacy or cost. There are approaches that describe incorporating such cloud-based systems/services within the 5G network, such as at the MEC.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud-based system and a comparison with the conventional firewall-based approach.

FIG. 5 is a block diagram of a user device, which may be used with the cloud-based system or the like.

FIG. 6 is a diagram illustrating various techniques to forward traffic to the cloud-based system.

FIG. 7 is a diagram of a ESIM/iSIM/SIM-card-based approach for network path and connectivity to the cloud-based system.

FIG. 8 is a diagram of an Application-aware Networking (APN) approach with a mobile network for network path and connectivity to the cloud-based system.

FIG. 14 is a flowchart of a process for hyperfine network slicing via the cloud-based system integrated within a 5G network.

DETAILED DESCRIPTION OF THE DISCLOSURE

Again, the present disclosure relates to systems and methods for hyperfine network slicing via a cloud-based system incorporated in a 5G network.

Example Cloud-Based System Architecture

Figure 1A:
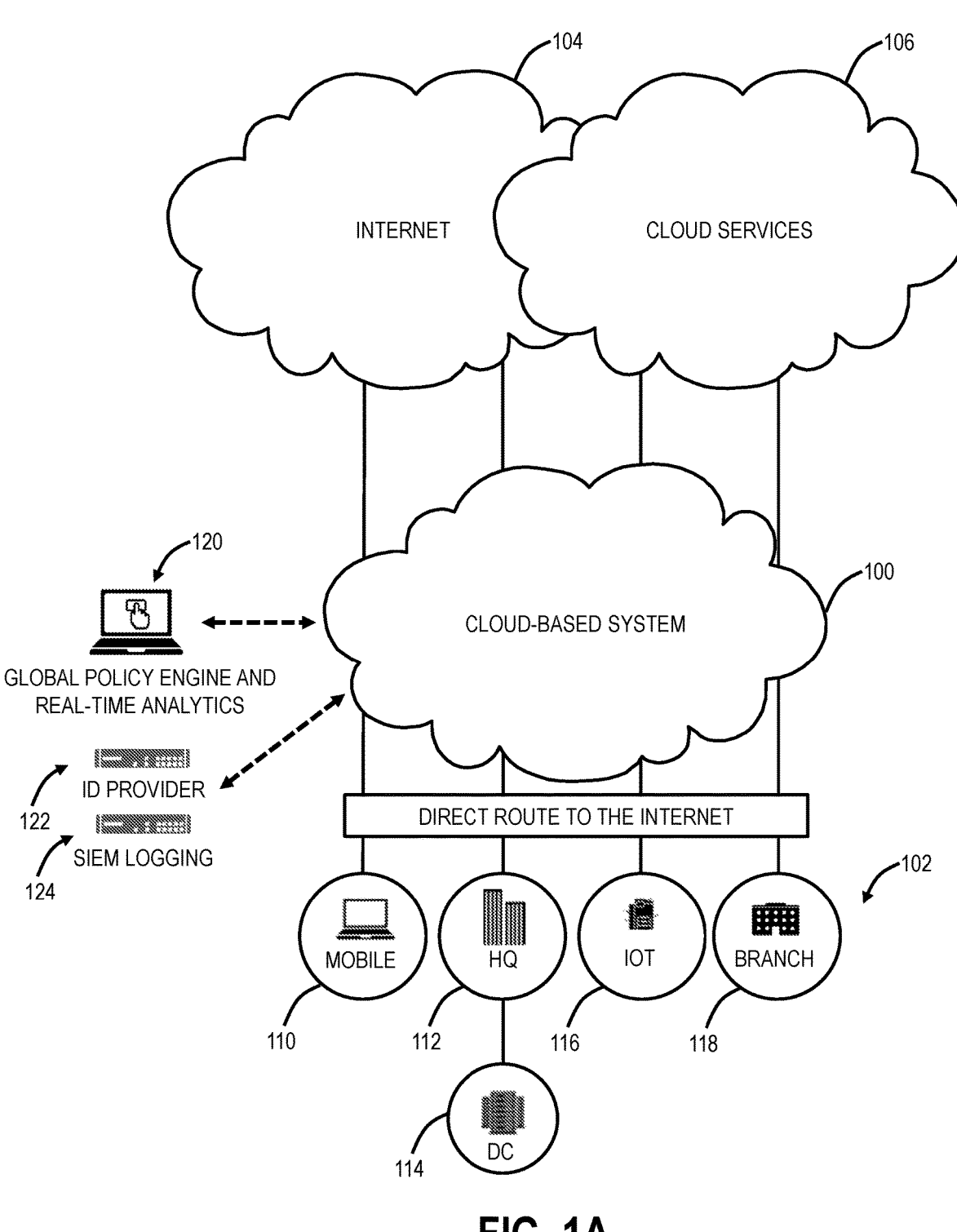
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
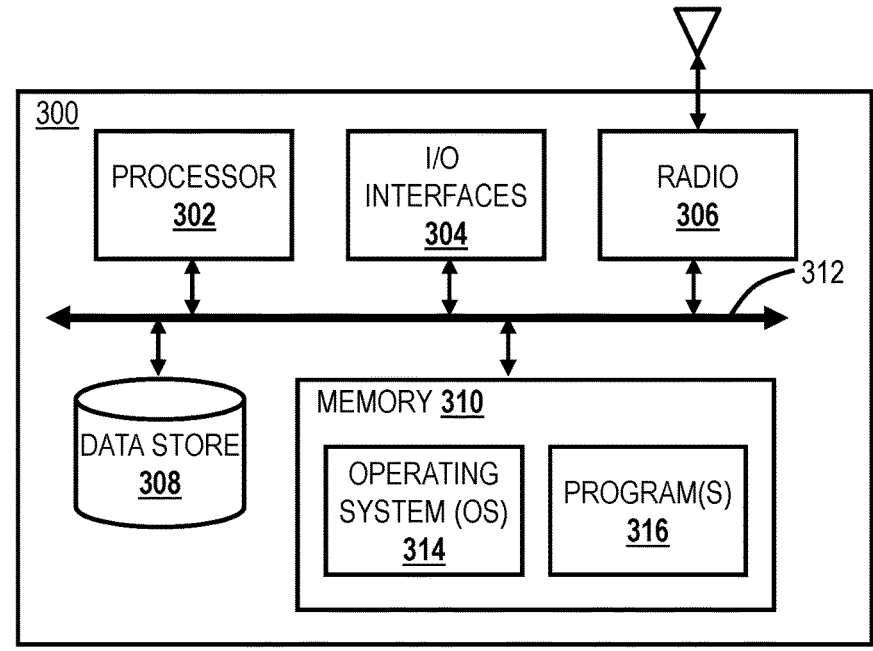

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
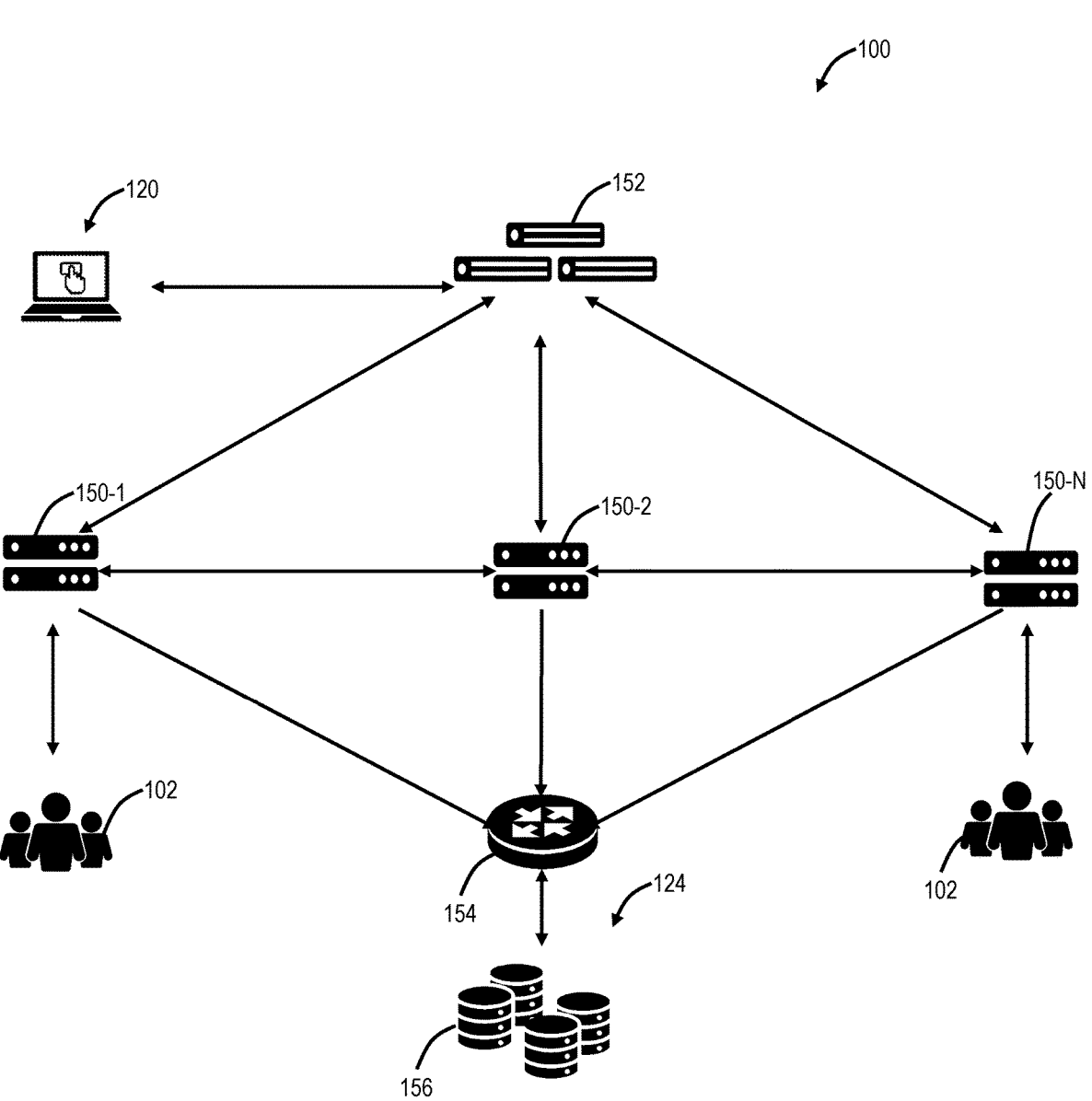
FIG. 2 is a network diagram of an example implementation of the cloud-based system.
Figure 4:
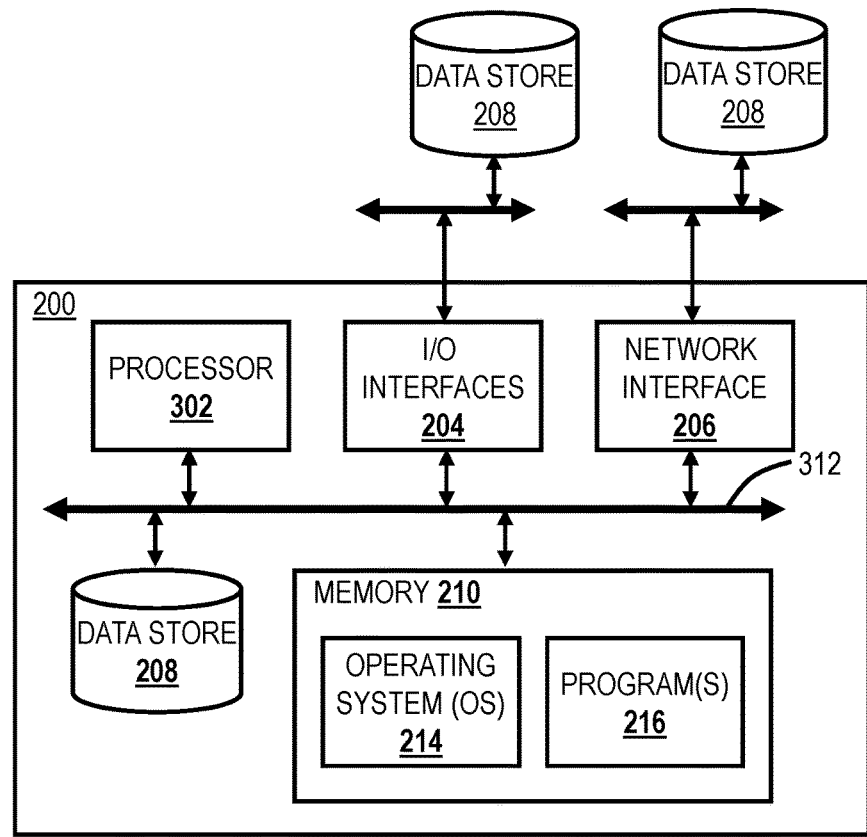
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE), service edge, or simply a node in the cloud-based system 100.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

User Device Application for Traffic Forwarding and Monitoring

Figure 3:
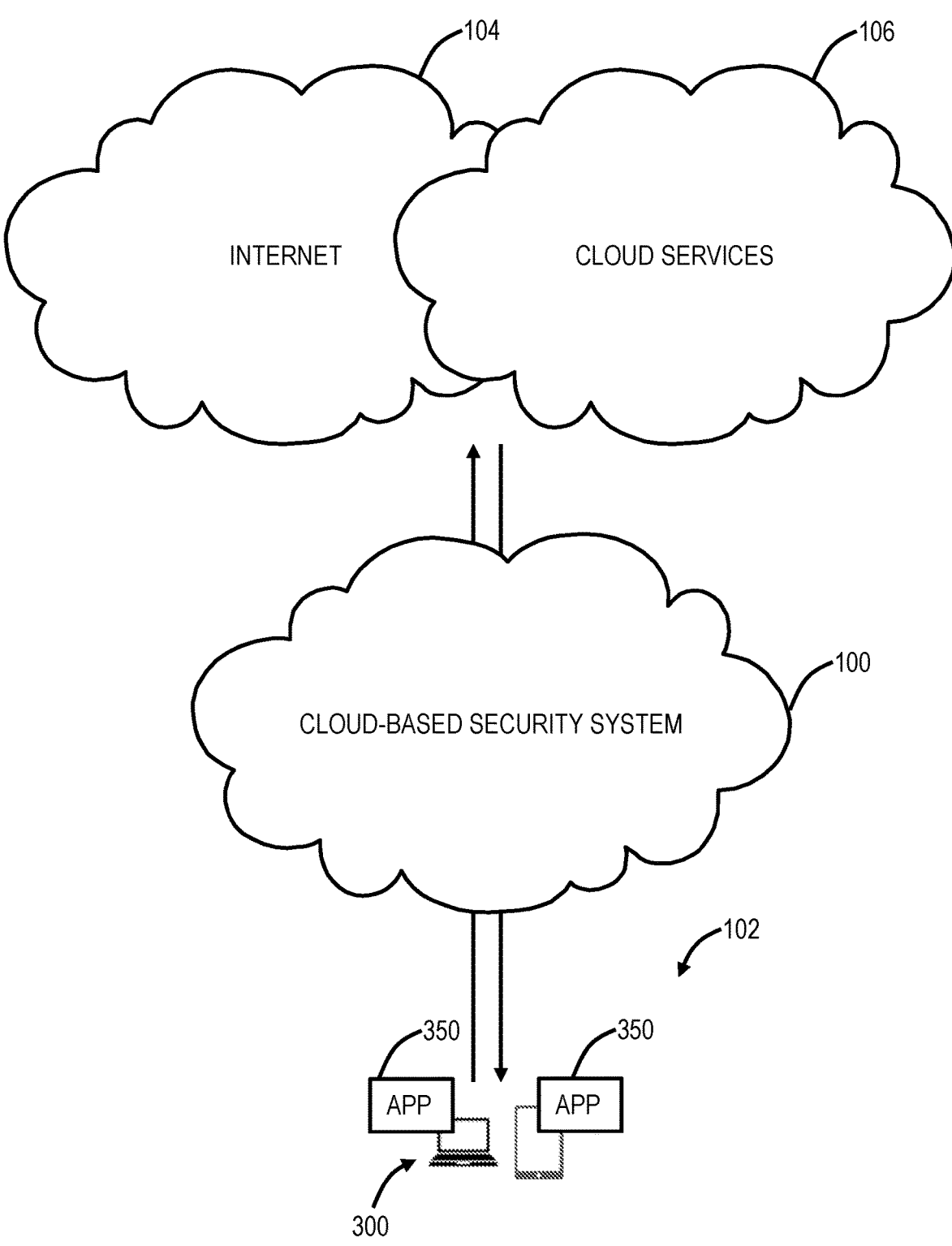
FIG. 3 is a network diagram of the cloud-based system illustrating an application on the user devices with users configured to operate through the cloud-based system.

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or user 102 setup.

Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Cloud Connectivity

FIG. 6 is a diagram illustrating various techniques to forward traffic to the cloud-based system 100. These include, for example, use of the application 350 as a client connector for forwarding traffic, use of a connector 400 app, use of the VNF 502 or some other device, use of an edge connector 150A, and use of an eSIM/iSIM/SIM-card 600. The application 350 can be referred to as a client connector and it is via a native application executed on the user device 300 as well as being user ID-based. The connector 400 can be referred to as an app connector such as for inside-out connections to private applications (virtual private access). The edge connector 150A can be referred to as a private service edge and includes a node in the cloud-based system 100 that can be hosted in a customer's environment, to extend the cloud-based system 100 therein.

There is a requirement to get any customer traffic to/from the cloud-based system 100. However, there is a gap on some devices. The current approach, e.g., with the application 350, the connector 400, etc. there is a reliance on the device, namely installation of a forwarding app, a reliance on an operating system, namely virtual interfaces, and a reliance on forwarding gateways, namely the edge connector 150A. However, these may not be available with other types of devices such as IoT devices and the like. As described herein, the present disclosure utilizes the term client device to include, without limitations IoT devices (e.g., smart scooters, etc.), Operational Technology (OT) platforms (e.g., Supervisory Control and Data Acquisition (SCADA) systems, Industrial Control Systems (ICS), etc.), medical equipment (e.g., CAT and MRI scanners, etc.), connected vehicles, and practically any device that has a Subscriber Identification Module (SIM) in the form of a card, an eSIM, or an iSIM. Those skilled in the art will recognize that a client device differs from the user device 300 as it may not have the ability to implement the application 350, not support a user ID for identifying the user 102, etc.

The present disclosure includes two additional techniques for cloud connectivity for IoT devices including an eSIM/ iSIM/SIM-card 600 based approach and a cloud/branch/thing connector 604. The ESIM/iSIM/SIM-card 600 based approach can be referred to as a device connector. The ESIM/iSIM/SIM-card 600 based approach is used for forwarding traffic from any SIM-based device (e.g., 2G to 5G and beyond). The key here is identity is based on the ESIM/iSIM/SIM-card 600, namely the International Mobile Equipment Identity (IMEI), as opposed to a user ID. There is no need for a SDK implemented by the third-party manufacturers, thereby bypassing development and patching processes. The eSIM/iSIM/SIM-card 600 approach provides its own network path and connectivity to the cloud-based system 100 as illustrated in FIG. 7; no gateway is needed, and it is a plug and play approach.

The eSIM/iSIM/SIM-card 600 approach leverages the fact that eSIM/iSIM/SIM-card 600 can have compute capabilities and the ability to implement functions including encryption. A TLS tunnel or the like is established from the eSIM/iSIM/SIM-card 600 to the cloud-based system 100. For example, this can include development via JavaCard which is a software technology that allows Java-based applications (applets) to be run securely on smart cards and similar small memory footprint devices, such as the eSIM/iSIM/SIM-card 600 which has low power and memory. Advantageously, this approach requires no reliance on the device and the forwarding is from the eSIM/iSIM/SIM-card 600. Thus, this approach can work across various platforms, namely any device that uses the eSIM/iSIM/SIM-card 600. The eSIM/iSIM/SIM-card 600 approach can also be implemented with a global Mobile Virtual Network Operator (MVNO)/Roaming agreement.

The cloud/branch/thing connector 604 can use the VNF 502 as well and includes forwarding of server traffic and is implemented on a hardware device connected to a network. The cloud/branch/thing connector 604 can be used in an Application-aware Networking (APN) approach with a mobile network 650 as illustrated in FIG. 8. This approach leverages an APN as a gateway for traffic to forward to the cloud-based system 100. This, similar to the eSIM/iSIM/SIM-card 600 approach, can be used on any Mobile Network Operator (MNO) network.

APN

Figure 9:
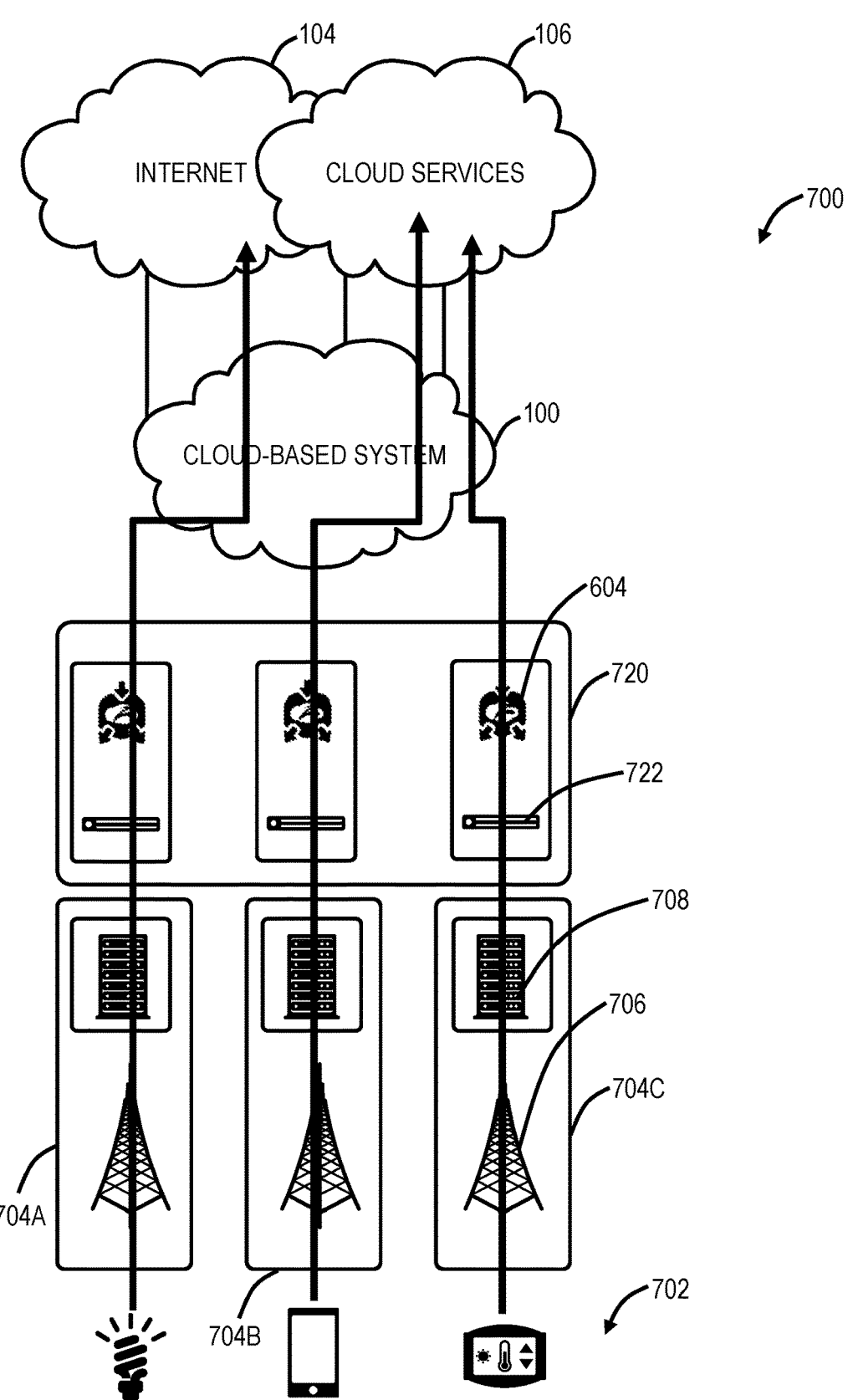
FIG. 9 is a network diagram of an APN network for traffic forwarding of IoT devices to the cloud-based system, such as for secure access to the Internet, to cloud services, etc.

FIG. 9 is a network diagram of an APN network 700 for traffic forwarding of IoT devices 702 to the cloud-based system 100, such as for secure access to the Internet 104, to cloud services 106, etc. Of note, the APN network 700 is illustrated with the client devices 702, but it could work with any type of user device 300. The client devices 702 are provisioned to operate on the APN network 700 with the eSIM/iSIM/SIM-card 600 as the ID. Traffic is passed from the local radio network to the carrier core, transparent to end client device 702.

The APN 700 is illustrated with three example Mobile Network Operators (MNOs) 704A, 704B, 704C, e.g., AT&T, Verizon, T-Mobile, etc. As is known in the art, MNOs 704 include radios 706 for wireless connectivity and servers 708 for processing. The MNOs 704 provide radio infrastructure, can include roaming agreements, and contract agreements with a Mobile Virtual Network Operator (MVNO) 720.

The APN network 700 includes the MVNO 720 which is a wireless communications services provider that does not own the wireless network infrastructure over which it provides services to its customers. The MVNO 720 enters into a business agreement with the MNOs 704 to obtain bulk access to network services at wholesale rates, then sets retail prices independently. The MVNO 720 may use its own customer service, billing support systems, marketing, and sales personnel, or it could employ the services of a Mobile Virtual Network Enabler (MVNE). The present disclosure utilizes the known concept of the MVNO 720 to forward traffic to the cloud-based system 100. The MVNO 720 can include servers 722 and the cloud/branch/thing connector 604 for connectivity to the cloud-based system 100.

Figure 10:
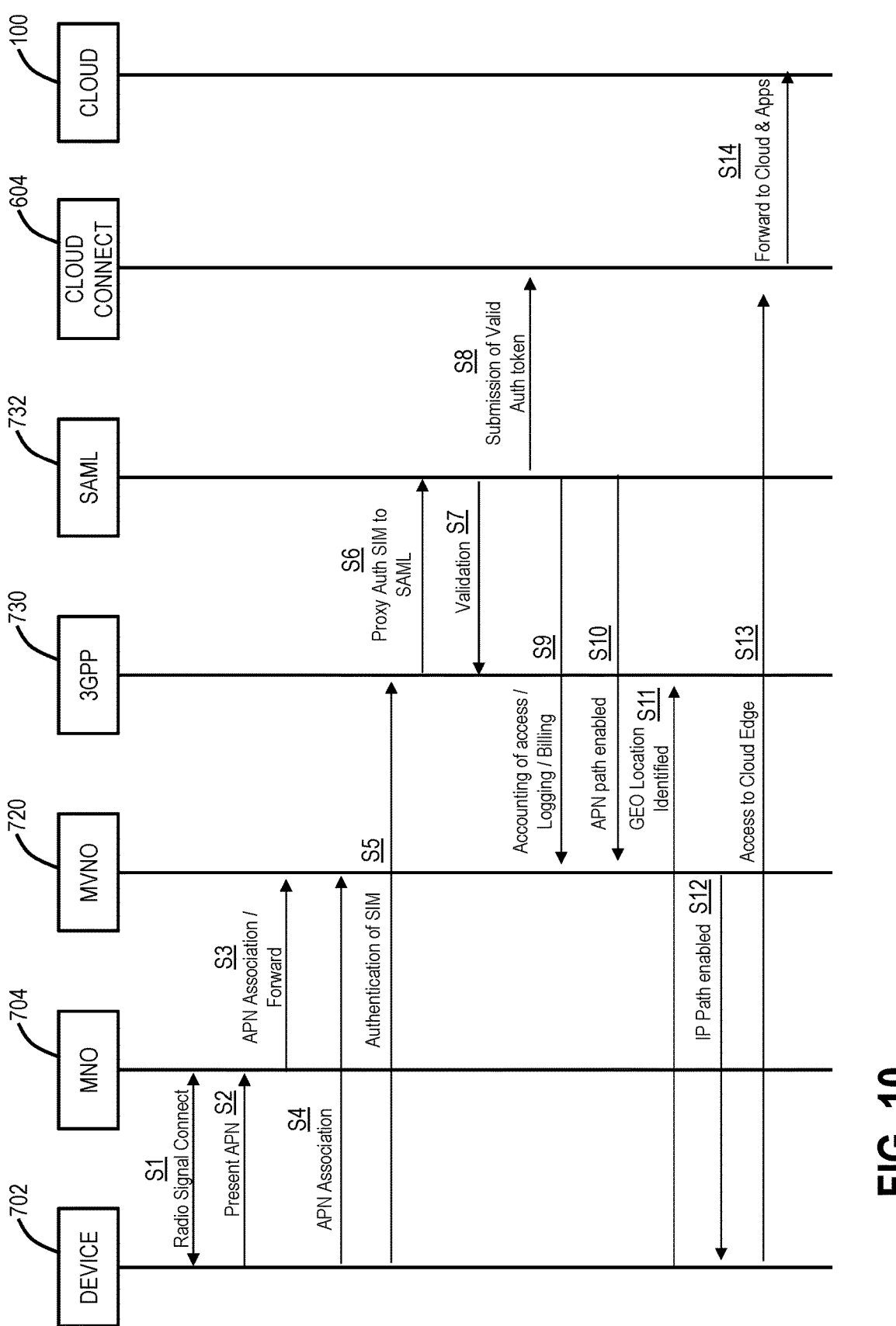
FIG. 10 is a flow diagram of communication in the APN network.

FIG. 10 is a flow diagram of communication in the APN network 700. FIG. 10 includes interactions between the client device 702, the MNO 704, the MVNO 720, a 3rd Generation Partnership Project (3GPP) 730 service, a Security Assertion Markup Language (SAML) 732 service, the cloud/branch/thing connector 604, and the cloud-based system 100. The device 702 connects via radio signals to the MNO 704 (step S1) and presents its configuration in the APN (step S2). The MNO 704 provides the APN association and forwarding to the MVNO 720 (step S3) and the device 702 is associated with the APN (step S4). The device 702's ESIM/iSIM/SIM-card 600 is authenticated using the 3GPP 730 services (step S5) which uses a proxy authentication of the ESIM/iSIM/SIM-card 600 to the SAML 732 service (step S6) which provides validation (step S7) and submission of a valid authentication token to the cloud connector 604 (step S8).

The SAML service 732 can provide accounting of access/logging/billing information to the MVNO 720 (step S9) and enable a path to the MVNO 720 (step S10). The device 702 has geolocation enabled as well through the 3GPP 730 services (step S11) and an IP path is enabled to the MVNO 720 (step S12). The device 702 now has access to the cloud edge via the MVNO 720 (step S13) and the cloud connector 602 forwards traffic to the cloud and applications (step S14).

Advantageously, the APN network 700 enables cloud connectivity for any ESIM/iSIM/SIM-card 600 connected device, including the client devices 702, the user devices 300, etc. All traffic from any device that is enrolled in the APN network 700 can be forwarded to the cloud-based system 100, with traffic forward from the MNO 704 to the MVNO 720 to the cloud connector 604 to the cloud-based system 100. The APN network 700 also removes the need for a client such as the application 350 or an SDK, as well as removing the need for physical network connections or gateways, just ride the APN network 700 to the cloud-based system 100. This removes the barrier to entry—no software to manage at the client level, no patching, etc. Existing providers connect devices through the APN network 700 to a firewall and then on to the Internet. The firewall is used to isolate the devices on APN—no security layer. In an embodiment, this allows the client devices 702 to obtain security services from the cloud-based system 100.

Network Slices

Figure 11:
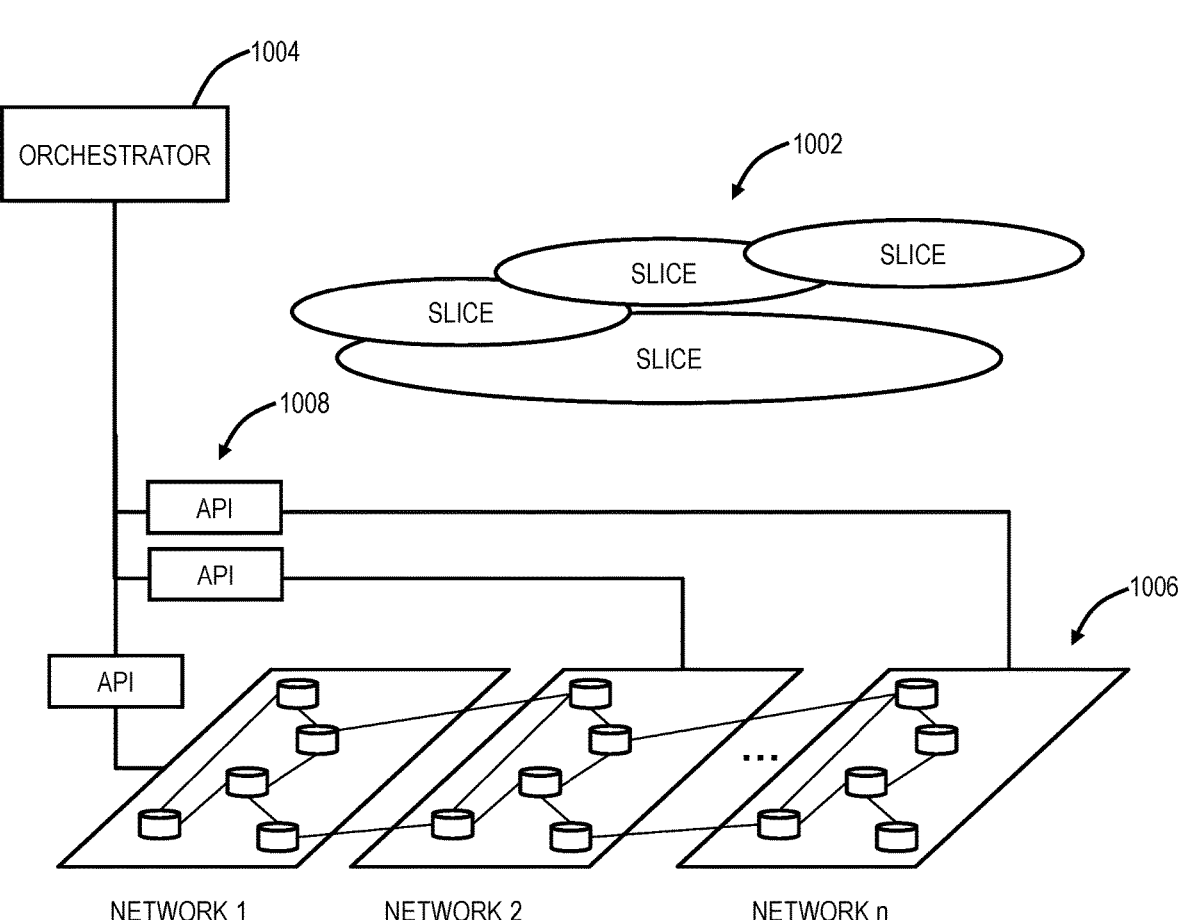
FIG. 11 is a network diagram of a network illustrating network slices and an orchestrator.

FIG. 11 is a network diagram of a network 1000 illustrating network slices 1002 and an orchestrator 1004. The network 1000 includes one or more networks 1006, which can include physical network elements, virtual network elements, and combinations thereof supporting network, compute, and/or storage resources. For illustration purposes, FIG. 11 includes different networks 1, 2, . . . , n. The network slices 1002 are services provisioned on the network, compute, and/or storage resources, via the corresponding network elements, across the networks 1006. Again, the network slices 102 can span across multiple parts of the network 1000 (e.g., terminal, access network, core network, and transport network) and could also be deployed across multiple operators/service providers, i.e., the networks 1006. The network slices 1002 can include dedicated and/or shared resources, e.g., in terms of processing power, storage, and bandwidth and has isolation from the other network slices.

Slice types could be defined from a functional, operational, or behavioral perspective. The orchestrator 1004 can be a processing apparatus, such as illustrated in FIG. 4. The orchestrator 1004 can communicate with the networks 1006 and the corresponding network elements via Application Programming Interfaces (APIs) 1008.

Network slicing is the main building block of Network-as-a-Service (NaaS) and an imperative construct of 5G technology. It allows multiple, logical networks to be created on top of a commonly shared physical infrastructure that is capable of supporting a broader service portfolio. Each virtual network (network slice 1002) is a combination of an independent set of logical network functions that support the requirement of a particular use case. Each will be optimized to provide the resources and network topology for the specific service and traffic that will use the slice. Functions such as policy, speed, capacity, connectivity, coverage, and security will be allocated to meet the particular demands of each use case, but functional components may also be shared across different network slices 1002.

Each slice 1002 will be completely isolated so that no slice 1002 can interfere with the traffic in another slice 1002. Each will be configured with its own network architecture, engineering mechanism, and network provisioning. It will typically contain management capabilities, which may be controlled by the network operator or the customer depending on the use case. It will be independently managed and orchestrated, via the orchestrator 1994.

Therefore, the key challenge when designing a network slicing solution is to ensure the creation of secure, very firmly isolated virtual networks, each of which serve a different use case for a certain user, tenant or application.

5G Network+the Cloud-Based System

Figure 12:
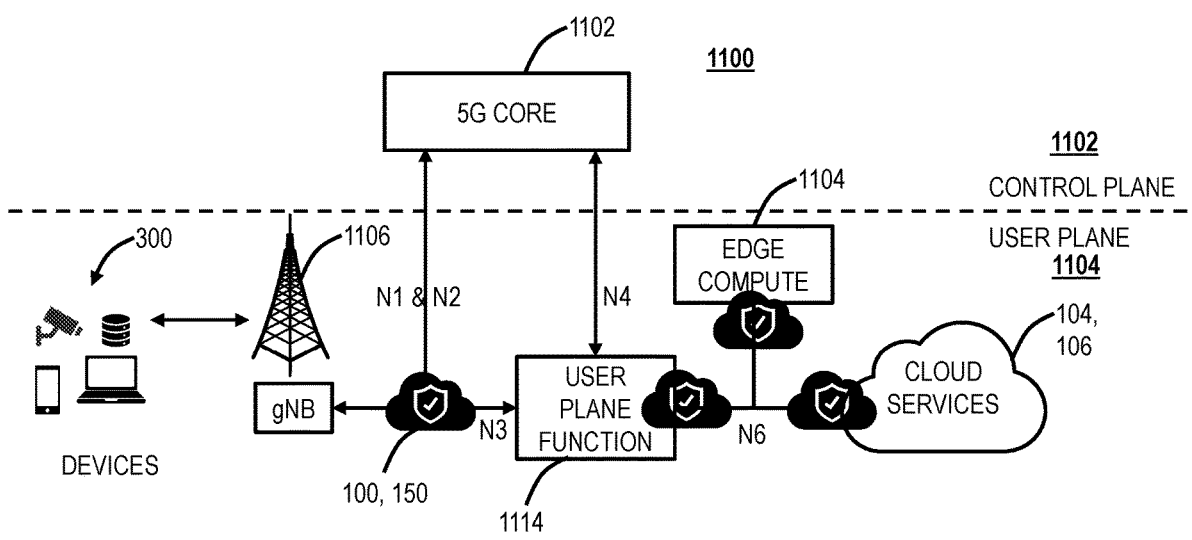
FIG. 12 is a diagram illustrating integration of a 5G network with the cloud-based system.

FIG. 12 is a diagram illustrating integration of a 5G network 1100 with the cloud-based system 100. Of note, the cloud-based system 100 is a collection of nodes 150. It is possible to extend the cloud-based system 100 by hosting nodes 150 in the 5G network. FIG. 12 illustrates an example approach. Here, there can be nodes 150 in a 5G core 1102, in edge compute 1104, and in the cloud. Various devices 300 can communicate with the 5G network 1100 via a base station 1106, e.g., a gNodeB (gNB). The 5G network 1100 in FIG. 12 is illustrated in a functional sense where there is a control plane 1110 with the 5G core 1102 and a user plane 1112. The user plane 1112 includes user plane functions 1114 and the edge compute 1104.

There are various instances of the cloud-based system 100, such as nodes 150, dispersed in the user plane 1104. These include monitoring traffic on various N interfaces in the 5G network 1100. The cloud-based system 100 can monitor the N1 and N2 interfaces—N1 is for the Non-Access Stratum (NAS) protocol between the core network 1102 and the handset (device 300), N2 is a network interface between the core network 1102 and the base station 1106. The cloud-based system 10 can monitor the N3 interface which provides user data from the RAN to the User Plane Function. The cloud-based system 100 can monitor the N4 which is the bridge between the control plane 1102 and the user plane 1104. Further. The cloud-based system 100 can monitor the N6 interface which the portion of the 5G network 1100 that carries data from the User Plane Function (UPF) to the Internet 104, the cloud services 106, etc.

With the cloud-based system 100 it is possible to enforce zero trust from the devices 300 to the edges, to the cloud, etc. while providing visibility and integration with cloud monitoring services (e.g., ZIA, ZPA, ZDX, etc.). Advantageously, the cloud-based system 100 enables security in 5G as the 5G standard evolves.

Hyperfine Network Slicing

With the cloud-based system 100 integrated in the 5G network, it is possible for the cloud-based system 100 to provide zero trust security for wireless networks supporting arbitrary packet-based data transmission including 5G, 5G-Advanced, and 6G, 4G LTE (using enhanced packet core architecture) and other wireless networks that include, but are not limited to, GEO (Geostationary Earth Orbit), LEO (Low Earth Orbit), MEO (Medium Earth Orbit), and ICO (Intermediate Circular Orbit) networks, non-Earth orbit Space networks and the classical network transport portions of Quantum Transmission Networks.

The cloud-based system 100 extends zero trust security from user equipment (UE) endpoints to workloads executing on Edge Compute, Multiaccess Edge Compute (MEC), public/private data centers, and public/private clouds. Any packet-based data transmission network that interfaces with the wireless transmission network.

Figure 13:
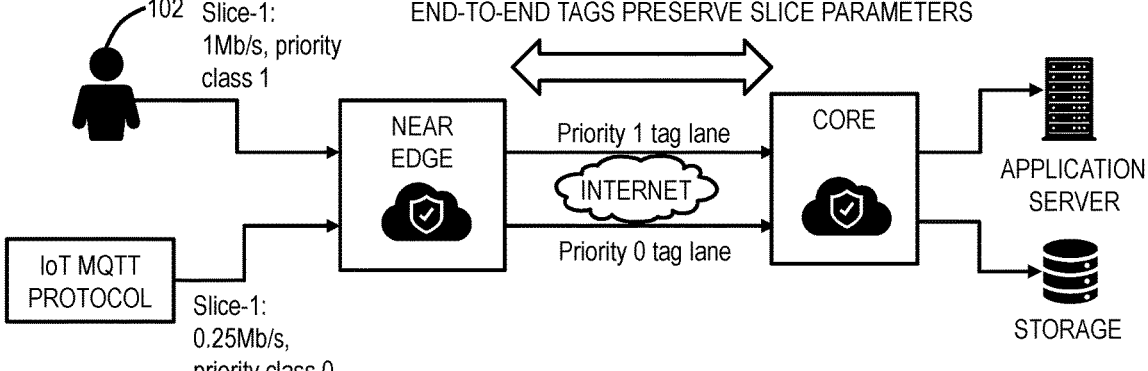
FIG. 13 is a diagram of the 5G network with the cloud-based system for providing hyperfine network slicing.

Major system components are (see FIG. 13):

All cloud configuration and protection services on the data path, from the cloud-based system Virtualized application function that communicated with the telecommunications network core to get/set network functions and traffic configurations Virtualized function that works with the User Plane Function (UPF) in a 5G telecommunications works (and equivalents in other wireless networks) to inspect all traffic flowing through the UPF and determine when and if to modify UPF and Core behaviors via core signaling mechanisms; all traffic from the radio network is intercepted and analyzed and cloud protection services applied; all signal traffic to and from the telecommunication core is also routed through the function for analysis and application of protection services The system components interact with one another, and the telecommunications network components to:

Guarantee Quality of Service (upload/download speed, bandwidth, latency, prioritization, allocation, retention, modification of QoS within a slide in real-time) within the telecommunications network (or network slice if that feature is available); these features are carried out at the application level in addition to the lower network levels Hyperfine Network Slicing is enabled within a telecommunications network (or network slice) where Individual UE apps connecting to specific workloads and specific workload ports can have a QoS as described above in addition to the baseline provided by the network slice the UE is associated with At the Edge (MEC) this system can guarantee QoS for critical applications; for example, a critical IoT sensor a factory Edge talking to sensor application executing in a MEC can get a guaranteed QoS compared to and employee using a laptop browser to talk to an external website Hyperfine Network Slicing is offered at the 1) Application and 2) port level and 3) protocol levels Support QoS from end-to-end from endpoint to workload regardless of location, limited only by underlying network latency and capacity General slice assurance and slice orchestration within a network slice are key to realizing the network slicing QoS on a per device basis without needing the 5G network administrator to continually re-provision tele-communications network slices for the customer The number of hyperfine network slices per telecommunications network slice are limited only by available bandwidth and compute capacity The virtualized function operating with the User Plane Function (UPF) in a 5G telecommunications works (and equivalents in other wireless networks) is capable of continuous operation whether it is connected to the cloud-based system 100 or not; it can handles all local 5G/Edge traffic with intermittent connection to the cloud-based system 100 for security, rules, and other updates that are downloaded and implemented; at the same time, the local virtualized function will spool collected threat, telemetry, and other data for upload to the cloud-based system 100 upon connection Hyperfine Network Slicing Via the Cloud-Based System Integrated within a 5G Network FIG. 14 is a flowchart of a process 1200 for hyperfine network slicing via the cloud-based system integrated within a 5G network. The process 1200 includes connecting with a device that connects to the 5G network, wherein the cloud-based system includes a plurality of nodes interconnected to one another and including one or more nodes integrated in a user plane of the 5G network (step 1202); inline monitoring traffic between the device and destinations including any of the Internet, cloud services, private applications, edge compute, Multiaccess Edge Compute (MEC), public/private data centers, and public/private clouds (step 1204); and enforcing bandwidth control, in the 5G network, to a defined Quality of Service for a slice associated with the device (step 1206).

The inline monitoring traffic can include one or more of allowing, blocking, and limiting traffic to and from the device, based on policy and content. The allowing, blocking, and limiting traffic can be between the device and any of the Internet, cloud services, private applications, edge compute, Multiaccess Edge Compute (MEC), public/private data centers, and public/private clouds. The inline monitoring traffic can be on interfaces in the 5G network including an N1 interface, an N2 interface, an N3 interface, an N4 interface, and an N6 interface.

The one or more nodes can be integrated in the user plane of the 5G network are virtualized network functions. The bandwidth control can include enforcing upload/download speed, bandwidth, latency, and prioritization, of the traffic. The bandwidth control can be on a per application basis. The slice can be defined in the cloud-based system and the 5G network on a application level, a port level, and a protocol level.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method implemented via a cloud-based system for network slicing in a 5G network, the method comprising steps of:

connecting with a device that connects to the 5G network, wherein the cloud-based system includes a plurality of nodes interconnected to one another and including one or more nodes integrated in a user plane of the 5G network;

inline monitoring traffic between the device and destinations including any of the Internet, cloud services, private applications, edge compute, Multiaccess Edge Compute (MEC), public/private data centers, and public/private clouds; and enforcing bandwidth control, in the 5G network, to a defined Quality of Service for a slice associated with the device, wherein the slice is defined in the cloud-based system and the 5G network on a application level, a port level, and a protocol level.

2. The method of claim 1, wherein the inline monitoring traffic includes:

one or more of allowing, blocking, and limiting traffic to and from the device, based on policy and content.

3. The method of claim 2, wherein the allowing, blocking, and limiting traffic is between the device and any of the Internet, cloud services, private applications, edge compute, Multiaccess Edge Compute (MEC), public/private data centers, and public/private clouds.

4. The method of claim 1, wherein the inline monitoring traffic is on interfaces in the 5G network including an N1 interface, an N2 interface, an N3 interface, an N4 interface, and an N6 interface.

5. The method of claim 1, wherein the one or more nodes integrated in the user plane of the 5G network are virtualized network functions.

6. The method of claim 1, wherein the bandwidth control includes enforcing upload/download speed, bandwidth, latency, and prioritization, of the traffic.

7. The method of claim 1, wherein the bandwidth control is on a per application basis.

8. A cloud-based system for network slicing in a 5G network, the cloud-based system comprising:

a plurality of nodes interconnected to one another and including one or more nodes integrated in a user plane of the 5G network, each of the plurality of nodes is configured to connect with a device that connects to the 5G network;

inline monitor traffic between the device and destinations including any of the Internet, cloud services, private applications, edge compute, Multiaccess Edge Compute (MEC), public/private data centers, and public/private clouds; and enforce bandwidth control, in the 5G network, to a defined Quality of Service for a slice associated with the device, wherein the slice is defined in the cloud-based system and the 5G network on a application level, a port level, and a protocol level.

9. The cloud-based system of claim 8, wherein the inline monitor traffic includes:

one or more of allowing, blocking, and limiting traffic to and from the device, based on policy and content.

10. The cloud-based system of claim 9, wherein the allowing, blocking, and limiting traffic is between the device and any of the Internet, cloud services, private applications, edge compute, Multiaccess Edge Compute (MEC), public/private data centers, and public/private clouds.

11. The cloud-based system of claim 8, wherein the inline monitor traffic is on interfaces in the 5G network including an N1 interface, an N2 interface, an N3 interface, an N4 interface, and an N6 interface.

12. The cloud-based system of claim 8, wherein the one or more nodes integrated in the user plane of the 5G network are virtualized network functions.

13. The cloud-based system of claim 8, wherein the bandwidth control includes enforcing upload/download speed, bandwidth, latency, and prioritization, of the traffic.

14. The cloud-based system of claim 8, wherein the bandwidth control is on a per application basis.

* * * * *